United States Patent Office 2,862,069
Patented Nov. 25, 1958

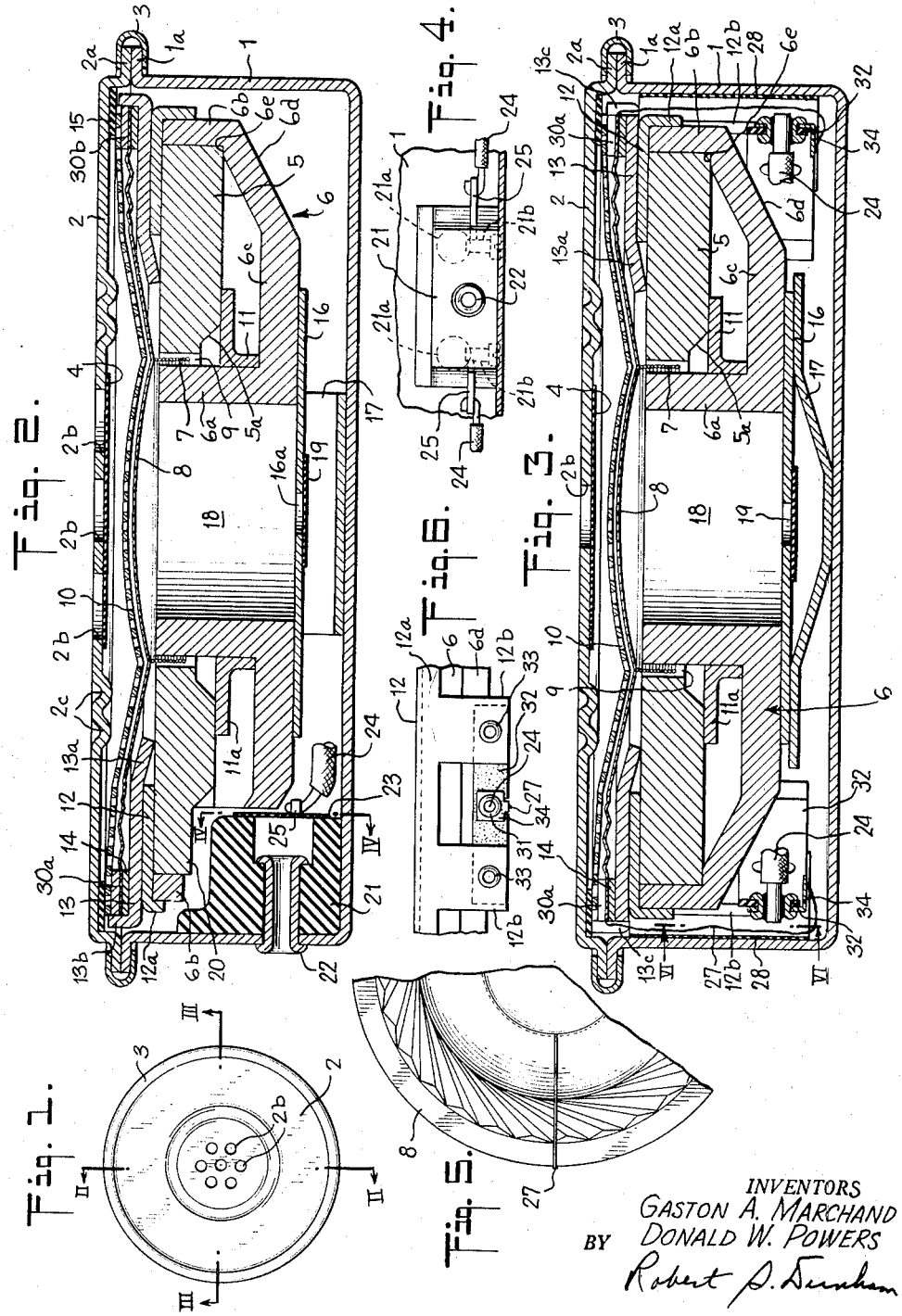
INVENTORS
GASTON A. MARCHAND
DONALD W. POWERS
BY
Robert P. Dunham
ATTORNEY

2,862,069

DYNAMIC TRANSDUCER

Gaston A. Marchand, New York, and Donald W. Powers, Glen Cove, N. Y., assignors to Roanwell Corporation, Brooklyn, N. Y., a corporation of New York Application February 28, 1956, Serial No. 568,232

8 Claims. (Cl. 179—115.5)

This invention relates to dynamic transducers for converting electrical energy into sound wave energy and vice versa. The invention is described herein as applied to an earphone receiver, but in its broader aspects it is applicable to other types of dynamic transducers of more general utility.

The performance requirements for earphone receivers for pilots in jet aircraft are considerably more severe than performance requirements for transducers of the prior art. Earphone receivers for use in jet aircraft are required to be light in weight and to be thin enough to be received inside a protective helmet without undesirably increasing the bulk of the helmet. Furthermore, the receivers are required to maintain their acoustic properties over a variation in altitude from sea level to 35,000 feet or more, and to maintain a minimum variation in efficiency over the entire altitude range.

An object of the present invention is to provide a dynamic transducer suitable for use as an earphone receiver in jet aircraft.

Another object is to provide a dynamic transducer which is substantially thinner in contour and lighter in weight than the transducers of the prior art.

Another object is to provide a dynamic transducer which is not seriously affected by rapid changes in elevation and accompanying changes in atmospheric pressure.

Another object is to provide a dynamic transducer in which the magnetic field is provided by a radially permanently magnetized annular disk.

Other objects and advantages of the invention will become apparent from a consideration of the following description and claims, taken together with the accompanying drawing.

In the drawing:

Fig. 1 is a plan view of a dynamic transducer constructed in accordance with the invention, in substantially full scale;

Fig. 2 is a cross-sectional view taken on the line II—II of Fig. 1, on a greatly enlarged scale;

Fig. 3 is a cross-sectional view taken on the line III—III of Figure 1, on the same scale as Fig. 2;

Fig. 4 is a fragmentary view taken along the line IV—IV of Fig. 2;

Fig. 5 is a fragmentary plan view showing a portion of a diaphragm used in the transducer; and Fig. 6 is a fragmentary view taken along the line VI—VI of Fig. 3.

Referring now to the drawings, there is shown an earphone receiver suitable for use in jet aircraft and comprising a generally cup-shaped housing 1 and a cover 2 for the housing. The housing 1 and the cover 2 are provided with fastening flanges 1a, 2a, adapted to be engaged by a clamping ring 3 which holds the cover tightly on the housing. The cover 2 is provided with a number of apertures 2b, through which sound waves may pass into the interior of the housing or outwardly therefrom. The apertures 2b are preferably covered by a fabric screen 4 fastened as by cementing on the inside of the cover 2.

Within the housing 1 is mounted a transducer assembly including a permanent magnet disk 5, a yoke 6 of magnetic material, a coil 7 and a diaphragm 8.

The permanent magnet 5 is annular in form and is magnetized radially, i. e., so that one pole is distributed about its inner periphery and the other pole is distributed about its outer periphery. The yoke 6 is of magnetic material and comprises an inner cylinder 6a, an outer cylinder 6b concentric with the inner cylinder, and a web 6c connecting the lower ends of the two cylinders as they appear in the drawing. The outer edge of the web 6c is conical in form, as shown at 6d, so that the outer periphery of the web is spaced toward the permanent magnet disk 5 from the inner edge of the web 6c.

The permanent magnet disk 5 and the yoke 6 are symmetrical in form, thereby permitting efficient use of the magnetic material and avoiding saturation in all parts of the magnetic circuit.

The inner diameter of the permanent magnet disk 5 is somewhat larger than the outer diameter of the cylinder 6a so that there is provided between the permanent magnet disk and the cylinder 6a an air gap 9. The coil 7 is mounted on the diaphragm 8 for vibratory movement in the air gap 9. The coil 7 is pre-wound of very fine wire, and the turns are held together by coating the turns with a suitable bonding material as the coil is being wound. Additional bonding material may be applied with a brush after the winding is completed. The core is bonded to the lower surface of the diaphragm 8. A guard 10 of perforated sheet metal, limits the upward movement of diaphragm 8.

The permanent magnet disk 5 is tapered as shown at 5a, so that its edge adjacent the air gap 9 is thinner than the rest of the disk, thereby providing a concentration of the magnetic flux in the air gap.

The yoke 6 is provided with a shoulder 6e at the upper edge of the conical portion 6d. Shoulder 6e abuttingly receives the outer edge of the lower side of the permanent magnet disk 5 and locates that disk within the yoke 6.

A sealing ring 11 of non-magnetic material, e. g., aluminum, is positioned inside the yoke 6 adjacent the bottom of the cylinder 6a and is provided with a flange 11a which abuts against the inner portion of the disk 5. The upper and lower surfaces of the ring 11 are sealed with suitable bonding material. The function of ring 11 is to close the space below the diaphragm 8, so that the air space below the diaphragm is suitably limited in volume to provide the desired acoustic characteristics.

An inner centering ring 12 having a peripheral flange 12a extends over the top of the peripheral portion of the disk 5 and the upper end of the outer cylinder 6b of the yoke. The flange 12a engages the outer surface of the yoke cylinder 6b and the ring 12 is centered thereby on the yoke 6. The flange 12a has downwardly depending fingers 12b (Figs. 3 and 6), for a purpose described below. An outer centering ring 13 abuts against the upper surface of the inner centering ring 12. Both the rings 12 and 13 are of non-magnetic material and may be stamped from sheet aluminum, for example. The radially inner portion of the ring 13 has a tapered downwardly extending portion 13a which engages the inner periphery of the ring 12, thereby maintaining the rings 13 and 12 in concentric relationship. The outer diameter of centering ring 13 is greater than the outer diameter of any of the other elements of the transducer assembly so that while the ring 13 may conceivably touch the housing 1 or cover 2 at one point, it cooperates with the retainer ring 12 to keep the transducer assembly centered within the housing.

The centering ring 13 is provided on its periphery with an upstanding flange 13b. The diaphragm 8 has its peripheral margin bonded to a spacer ring 14 which fits within the flange 13b of the centering ring 13. The periphery of diaphragm 8 also fits within the flange 13b. Above the diaphragm 8 are a pair of arcuate spacer parts 30a, 30b, each slightly shorter than a semi-circle, and providing between their ends gaps for the passage of leads 27 extending to the coil 7. The guard 10 overlies the spacer parts 30a, 30b, and a gasket 15 is located between the guard 10 and the cover 2.

The back or lower side of the yoke 6, as it appears in the drawing, is covered by a non-magnetic plate 16. A leaf spring 17, of spring steel or other suitable material, is held in compression between the plate 16 and the bottom of housing 1. The spring 17 holds the other parts of the assembly together in vertical compression, and thereby maintains the gasket 15 compressed between the diaphragm 8 and the cover 2.

The inner cylinder 6a of the yoke 6 is hollow, so that it at least partly defines a chamber 18 which is effective to damp acoustically the diaphragm 8. The lower side of the chamber 18 as it appears in the drawing is closed by the plate 16, which is provided with an aperture 16a covered by a fabric screen 19. By the use of the aperture 16a, the space within the housing below the yoke 6 is effective to provide acoustical damping of the diaphragm.

The housing 1 and the cover plate 2 are of magnetic material. The guard 10 limits the travel of the diaphragm under conditions of rapid change in elevation, and thereby effectively prevents distortion of the diaphragm due to loading it beyond its elastic limit.

The permanent magnetic disk 5 may be manufactured from any suitable permanent magnet alloy such as Alnico 5, by heat treatment in a magnetic field of the direction desired. To obtain the proper magnetic flux direction during the heat treatment, the material used must have a Curie point higher than the temperature at which the heat treatment takes place.

The acoustic damping feature of the transducer mentioned above may be varied substantially by varying the depth of the center cavity, the size and numbers of the apertures 16a and the nature of the fabric screen or acoustic resistance 19. Acoustic damping is also provided on the upper side of the diaphragm 8 in the chamber between the diaphragm and the cover 2. Again, the damping effect here may be varied as required by changing the number and size of the openings 2b or by varying the size of the chamber by varying the number of a plurality of circular depressions 2c which are formed in the cover 2.

The yoke 6 and the magnet 5 are cut away, as illustrated at 20 in Fig. 2, to allow the insertion in the casing of a block 21 attached to the casing 1 by an eyelet 22 of insulating material. The inner end of eyelet 22 is received in a recess formed in the inner face of block 21. That recess is covered by a sheet 23 of acoustic resistance material, e. g., fabric. Eyelet 22 and acoustic resistance 23 form a pressure equalizing vent for the interior of the casing 1. Electrical connections may be made from external circuits to suitable jacks 21a (Fig. 4) formed in block 21 and aligned with apertures in the casing 1. Wires 24 are attached to binding posts 25, fixed in the block 21, and electrically connected to screws 21b which project into the jacks 21a to engage the pins of a plug inserted therein. The wires 24 extend to eyelets 31 mounted on insulating blocks 32 attached at their ends by eyelets 33 to the fingers 12b. Each eyelet 31 also fastens on its block 32 a binding post 34. Wires 27 are attached, as by soldering, to the binding posts 34 and extend through notches 13c in the centering plate 13 and thence through the gaps between the ends of the arcuate spacers 30a, 30b, to the space in back of diaphragm 8 and thence along the diaphragm 8, where they may be attached by cementing, to the coil 7.

Conical portion 6d of the yoke 6 provides space for accommodation of the electrical connections and binding posts. Sheets 23 of insulating material are inserted between the binding posts 25 and the housing 1.

While we have shown and described a preferred embodiment of our invention, other modifications thereof will readily occur to those skilled in the art, and we therefore intend our invention to be limited only by the appended claims.

We claim:

1. A transducer comprising an annular disk, permanently magnetized radially with one pole distributed about its inner periphery and the other distributed about its outer periphery; a yoke of magnetic material comprising an inner cylinder having an outer diameter smaller than the inner diameter of the disk, an outer cylinder concentric with said inner cylinder and having an inner diameter of a size to receive tightly the outer periphery of the disk, and a web connecting said inner and outer cylinders at one end; said disk being received in said yoke with its outer periphery engaging said outer cylinder and its inner periphery spaced from the inner cylinder and cooperating therewith to define an air gap, a coil received in said air gap, and means including a diaphragm supporting said coil in said gap for vibratory movement therewith in said magnetic field.

2. A transducer as defined in claim 1, in which said inner cylinder is hollow, including a plate abutting the outer side of the web and extending across the end of said hollow inner cylinder, said inner cylinder and said plate cooperating to define a chamber effective to damp said diaphragm acoustically, said plate being apertured to provide a further acoustic damping effect.

3. A transducer as defined in claim 1, in which said outer cylinder has on its inner surface a shoulder against which said disk abuts, and which locates the disk longitudinally of the cylinder.

4. A transducer as defined in claim 3, in which said shoulder locates the disk in a position spaced longitudinally of the cylinders from said web.

5. A transducer as defined in claim 2, including a sealing ring closing the space between the web and the inner periphery of the disk and thereby limiting the air space on the inside of the diaphragm.

6. A transducer as defined in claim 1, in which said yoke is constructed in one piece.

7. A transducer comprising a cup-shaped housing of magnetic material, a cover of magnetic material for said housing, said cover being apertured to permit the passage of sound waves, means fastening said cover on said housing; a transducer assembly within and spaced inwardly from said housing comprising an annular disk, permanently magnetized radially with one pole distributed about its inner periphery and the other distributed about its outer periphery; a yoke of magnetic material comprising an inner cylinder having an outer diameter smaller than the inner diameter of the disk, an outer cylinder concentric with said inner cylinder and having an inner diameter of a size to receive tightly the outer periphery of the disk, and a web connecting said inner and outer cylinders at one end; said disk being received in said yoke with its outer periphery engaging said outer cylinder and its inner periphery spaced from the inner cylinder and cooperating therewith to define an air gap, a coil received in said air gap, and means including a diaphragm supporting said coil in said gap for vibratory movement therewith in said magnetic field, a first centering ring of non-magnetic material having a flange engaging the periphery of the outer cylinder and a portion extending radially adjacent said disk, a second centering ring of non-magnetic material having a diameter greater than said first centering ring and a flange at its periphery to receive the periphery of said diaphragm, said second centering ring having a central portion contoured to engage tightly and center said first centering ring, said first and second centering rings cooperating to locate said disk and yoke within and spaced from said housing, a gasket between said centering ring flange and said cover, a non-magnetic plate in back of said yoke, and a spring held in compression between the bottom of the casing and said plate, and biasing said assembly toward the cover to hold all said parts in place and said gasket compressed.

8. A transducer as defined in claim 7, in which said web has a generally conical portion adjacent its outer edge, with the outer periphery of the web spaced longitudinally of the yoke toward the disk and away from the housing, said conical portion and the housing cooperating to define between them an annular space, and electrical connections for said coil extending through said space.

References Cited in the file of this patent

UNITED STATES PATENTS

| | | |
|---|---|---|
| 1,852,594 | Snow | Apr. 5, 1932 |
| 1,964,606 | Thuras | June 26, 1934 |
| 2,084,945 | Cornwell | June 22, 1937 |
| 2,293,078 | Proctor | Aug. 18, 1942 |
| 2,498,825 | Richards | Feb. 28, 1950 |
| 2,517,727 | Smith | Aug. 8, 1950 |
| 2,551,949 | Hunter | May 8, 1951 |
| 2,604,551 | Charlesworth | July 22, 1952 |

FOREIGN PATENTS

| | | |
|---|---|---|
| 617,906 | Great Britain | Feb. 14, 1949 |
| 902,015 | Germany | Jan. 18, 1954 |

Notice of Adverse Decision in Interference

In Interference No. 90,896 involving Patent No. 2,862,069, G. A. Marchand and D. W. Powers, DYNAMIC TRANSDUCER, final judgment adverse to the patentees was rendered May 28, 1965, as to claim 1.

[*Official Gazette December 14, 1965.*]